United States Patent [19]
DiNardo et al.

[11] Patent Number: 5,837,177
[45] Date of Patent: Nov. 17, 1998

[54] CONTROLLED NUCLEATION OF POLYPROPYLENE IN BIAXIALLY ORIENTED FILMS

[75] Inventors: Victor M. DiNardo; Nicholas Z. Karnavas, both of Monroeville Boro, Pa.

[73] Assignee: Aristech Chemical Corporation, Pittsburgh, Pa.

[21] Appl. No.: 880,232

[22] Filed: Jun. 23, 1997

[51] Int. Cl.$^6$ .............................. B29B 9/06; B29C 47/00; B29C 55/14

[52] U.S. Cl. .......................... 264/101; 264/141; 264/142; 264/210.6

[58] Field of Search ..................................... 264/101, 141, 264/142, 210.6

[56] References Cited

U.S. PATENT DOCUMENTS

| | | | |
|---|---|---|---|
| 5,658,514 | 8/1997 | Fujii et al. | 264/210.6 X |
| 5,716,570 | 2/1998 | Peiffer et al. | 264/210.6 X |

*Primary Examiner*—Leo B. Tentoni
*Attorney, Agent, or Firm*—Robert R. Gavlik

[57] ABSTRACT

A method of making a polypropylene product for use in making biaxially oriented films. The method includes the addition of an improved nucleating system that allows for even distribution of a nucleating agent in the polymer material. The improved nucleating system comprises a nucleating agent and a liquid miscible with the nucleating agent. The solution is combined with the polypropylene material, and the miscible liquid is removed during processing. The resulting films possess superior processing and material characteristics.

9 Claims, No Drawings

CONTROLLED NUCLEATION OF POLYPROPYLENE IN BIAXIALLY ORIENTED FILMS

TECHNICAL FIELD

This invention relates to an improved method for the controlled nucleation of polypropylene for use in biaxially oriented films. The improved method includes the addition of a solution comprising a nucleating agent such as sodium benzoate. The solution also comprises a liquid, such as water, which the nucleating agent is dissolved in. This nucleating system allows for the controlled dispersion of the nucleating agent within the polymer, and improves the processing characteristics of the film.

BACKGROUND OF THE INVENTION

Nucleating agents are known to increase the stiffness of processed materials. Nucleating agents also improve the optical and barrier properties of the resulting materials. Sodium benzoate is a desirable nucleating agent because, for among other reasons, its availability and economic practicality. However, the use of nucleating agents such as sodium benzoate in the production of biaxially oriented polypropylene films is generally not desirable.

Use of a nucleating agent in typical amounts creates processing difficulties in the film. This drawback can be reduced if smaller concentrations of nucleating agent are used, i.e. below 300 ppm. However, the use of nucleating agents, such as sodium benzoate, in smaller concentrations is similarly undesirable. If the concentration of sodium benzoate is reduced to levels under 300 ppm, the nucleating agent added will not be evenly distributed within the polypropylene.

One object of the present invention is to provide a method for the even dispersion of sodium benzoate within a biaxially oriented polypropylene film.

Another object of the present invention is to provide a method for the controlled nucleation of polypropylene for use in biaxially oriented films.

Another object of the present invention is to provide a method for the use of a solution comprising a nucleating agent, such as sodium benzoate, and a miscible liquid, such as water, wherein the nucleating agent is dissolved in the liquid. The solution acts as an improved nucleating system in the production of biaxially oriented polypropylene films.

A further object of the present invention is to provide a method for the use of an improved nucleating system in the production of biaxially oriented polypropylene films wherein the concentration of nucleating agent in the system is low enough to prevent the resulting film from becoming too difficult to process.

Yet another object of the present invention is to provide for a composition and products therefrom having a controlled dispersion of nucleating agent such as sodium benzoate. These products include pellets used in the manufacturing of biaxially oriented polypropylene films.

SUMMARY OF THE INVENTION

The present invention relates to an improved method of making biaxially oriented polypropylene ("BOPP") films. The method includes the use of a nucleating system comprising a nucleating agent and a miscible liquid such as water. This system allows for the even distribution of nucleating agent, and thus, improved process characteristics in the final product.

Typically, for BOPP film production, a nucleating agent is not added. The degree of nucleation and the optical properties can be improved through the addition of a nucleating agent. However, at concentrations below about 300 ppm, the dispersion of nucleating agent in the film cannot be controlled. Uneven nucleation will occur. Additionally, the processing characteristics of the film will suffer as the concentration increases.

The dispersion of nucleating agent in the film can be improved by increasing the concentration of nucleating agent to about 300 ppm or more. However, if the concentration of the nucleating agent is raised to these levels the film tends be brittle and difficult to process. The difficulty in processing is directly related to the concentration of nucleating agent.

The present invention overcomes the above drawbacks. The present invention is drawn to a method of nucleating polypropylene for use in biaxially oriented films, wherein a solution comprising a nucleating agent, such as sodium benzoate, and a miscible liquid, such as water, are added as a nucleating system. The amount of nucleating agent in the solution is about 25 to 1000 ppm, based on the weight of the final polymer material.

The nucleating agent in the system can be added at levels traditionally thought to be too high for adequate processing, i.e. about 300 ppm or more. At these levels, no appreciable loss of processing characteristics is noticed. The optical properties are, however, good.

At concentrations below 300 ppm, i.e. 25–300 ppm, the processing characteristics are good, and improvement in the optical properties is noted. Even dispersion of the nucleating agent in the system is achieved.

After the nucleating solution is added, the water is removed during processing. This can be accomplished by any method known in the art including devolatilization of the miscible liquid within a polypropylene extruder. The resulting polypropylene product will have a relatively even distribution of sodium benzoate resulting in the consistent nucleation, and will be relatively or completely free of residual liquid.

DETAILED DESCRIPTION OF THE INVENTION

In the present invention, polypropylene polymer suitable for use in biaxially oriented films is produced wherein a solution comprising a nucleating agent, such as sodium benzoate, and a liquid miscible with the nucleating agent, such as water, are used as a nucleating system.

The present invention is not limited to any one particular method of processing the feed stock material into the resulting BOPP films. However, our preferred method includes first, obtaining extrusion grade polypropylene homopolymer or copolymer in powder or other suitable form. The polypropylene is combined with stabilizer(s), acid scavengers and other additives commonly known and used in the art. The nucleating system is also added. The above are extruded into pellet, or processed into a powder or other suitable form, and the resulting pellets or other physical form are processed into BOPP film as is commonly known in the art. The above composition may also be processed directly into film material. The miscible liquid is devolatilized during the processing of the film. The resulting film will have a relatively even dispersion of nucleating agent, and thus, relatively even nucleation of the polymer film material. This film will also possess good optical properties. The even dispersion of nucleating agent will result in a BOPP film having good processing characteristics, even at concentrations of nucleating agent up to about 1000 ppm.

The nucleating system of the present invention will have a concentration of nucleating agent of about 25 to about 1000 ppm of the polymer to be processed into film. Preferably, it comprises about 50 to about 800 ppm of the polymer, and most preferably about 500 to about 650 ppm.

As stated above, the nucleating agent is added as part of a solution. The amount of miscible liquid added to the solution is not critical provided the nucleating agent is completely dissolved in the liquid, and the liquid can be devolatilized during processing. Typically, as little liquid as possible is added to reduce the amount of devolatilization during processing. The specific liquid used is not critical provided the liquid is not detrimental to polypropylene, sheet stock polymer or the processing system used. Most preferably, water is used as the miscible liquid at a concentration of about 0.5 g/ml.

The invention is illustrated, but not limited by the following examples:

EXAMPLE 1

Example 1 illustrates the improved processing characteristics obtained with the present invention. Three extrusion grade propylene mixtures were produced. Control Example 1a comprises 1.7 MF Homopolymer manufactured by Aristech Chemical Corporation. Example 1a also comprises DHT 4A, an acid scavenger, manufactured by Kyowa Chemical; Irgafos 168, and Irganox 1010, both are stabilizers manufactured by Ciba Specialty Chemicals Corporation; and sodium benzoate. Example 1b is identical to 1a except that the sodium benzoate is replaced with the nucleating solution of the present invention.

EXAMPLE 1a

| | wt % |
|---|---|
| 1.7 MF Homopolymer | 99.69 |
| DHT 4A | 0.025 |
| Irgafos | 0.150 |
| Irganox | 0.100 |
| Sodium benzoate | 0.035 |

EXAMPLE 1b

| | wt % |
|---|---|
| 1.7 MF Homopolymer | 99.69 |
| DHT 4A | 0.025 |
| Irgafos | 0.150 |
| Irganox | 0.100 |
| Sodium benzoate (in water (0.5 g/ml)) | 0.035 |

The above compositions were extruded into biaxially oriented films and compared. Tables 1 and 2 compares some of the properties of the above compositions.

TABLE 1

| Annealed DSC[1] | Example 1a | Example 1b |
|---|---|---|
| Tm° C. | 162.8 | 161.8 |
| Tc° C. | 124.5 | 118.8 |
| Crystallinity (%) | 63.0 | 61.3 |

[1]Sample size: 8–12 mg; under nitrogen blanket. Instrument: TA 912 DSC duel sample cell. Sample equilibrated to 200° C., isothermal for 5 min. Sample is ramped to 45° C. at a rate of 10.0° C./min. Then ramped to 215° C. at a rate of 15° C./min.

TABLE 2

| Isothermal DSC at 125° C.[2] | Example 1a | Example 1b |
|---|---|---|
| Crystallization Rate[3] (milliwatts/milligrams/min) | 3.36 | 1.02 |
| Crystallization Time[4] (min) | 2.42 | 3.57 |

[2]Sample size: 5–10 mg, under nitrogen blanket.: Instrument: TA 910 DSC Sample heated to 200° C. and held for 5 min, then transferred to an isothermal chamber held at 125° C. for 10 min.
[3]Crystallization Rate obtained from the isothermal curve.
[4]Crystallization Time is for full crystallization to occur.

As can be seen from Table 1, the temperature at which crystals begin forming is lower with the composition of the present invention. Table 2 illustrates the lower crystallinity rate and higher crystallinity time observed with the present invention. The lower rate and higher time allow for greater control of the nucleation of the polymer material during film production. It is believed the lower crystallization rate and higher crystallization time create a wider processing window in the tenter frame, and alleviate film splitting. This results in easier processing during biaxial stretching.

EXAMPLE 2

The compositions of Example 1 were modified as follows. Example 2a is a control polymer wherein no sodium benzoate has been added. Examples 2b and 2c identical to Examples 1a and 1b except that the amount of sodium benzoate has been increased.

EXAMPLE 2a

| | wt % |
|---|---|
| 1.7 MF Homopolymer | 99.725 |
| DHT 4A | 0.025 |
| Irgafos | 0.050 |
| Irganox | 0.100 |

EXAMPLE 2b

| | wt % |
|---|---|
| 1.7 MF Homopolymer | 99.69 |
| DHT 4A | 0.025 |
| Irgafos | 0.150 |
| Irganox | 0.100 |
| Sodium benzoate | 0.065 |

EXAMPLE 2c

| | wt % |
|---|---|
| 1.7 MF Homopolymer | 99.69 |
| DHT 4A | 0.025 |
| Irgafos | 0.150 |
| Irganox | 0.100 |
| Sodium benzoate (in water (0.5 g/ml)) | 0.065 |

Tables 3 and 4 again compare some of the properties of the present invention to the prior art.

TABLE 3

| Annealed DSC[5] | Example 2a | Example 2b | Example 2c |
|---|---|---|---|
| Tm° C. | 162.3 | 163.6 | 162.8 |
| Tc° C. | 113.1 | 126.5 | 117.2 |
| Crystallinity (%) | 60.6 | 64.0 | 63.0 |

[5]Test method same as for Table 1.

TABLE 4

| Isothermal at 125° C.[6] | Example 2a | Example 2b | Example 2c |
|---|---|---|---|
| Crystallization Rate (mw/mg/min) | 0.23 | 5.14 | 0.48 |
| Crystallization Time (min) | 7.1 | 2.2 | 4.3 |

[6]Test method same as for Table 2.

As can be seen from Tables 3 and 4, the present invention provides for greater control of the nucleation of the polymer material versus sodium benzoate alone. Example 2a did not utilize any nucleating agent, and is useful as a reference point in comparing the present invention to the prior art. Obviously a non-nucleated material would not possess the desired properties inherent in nucleated films. The stiffness, optics and barrier properties in BOPP film applications would be inferior to those of nucleated BOPP films.

TABLE 5

| Stress Yield v. Temperature[7] | 280° F. | 290° F. | 300° F. |
|---|---|---|---|
| Example 2a (control) | 508 | 410 | 270 |
| Example 2c | 519 | 414 | 273 |
| Example 2b | 607 | 463 | 297 |

[7]Two inch by two inch square samples, 21 mil thick, were cut from sheet stock which was unoriented. The films were stretched on a lab film stretcher manufactured by T.M. Long, Inc. The samples were heated to the specified temerature over a time of 25 seconds, and stretched at a rate of 3 inches/ second. Yield stresses shown are an average of five test stretches at the specified temperature.

Table 5 shows the direct relationship between yield stress and concentration of nucleating agent. Yield stress is known in the art as a measure of the force needed to reach the point at which irreversible polymer orientation occurs, and is a measure of the process characteristics of the film. Higher yield stress indicates a more difficult film to process.

The compositions of Examples 2a–2c were tested. As can be seen from Table 5, Examples 2a (no nucleating agent) and 2c (the present invention) had similar yield stress averages. However, Example 2b had a much higher average at each temperature. The above indicates that (1) the processing characteristics of films of the present invention are not appreciably different than unnucleated films, and (2) the nucleating system of the present invention yields a film which has improved processing characteristics over a film identical in all respects except that the nucleating agent is added directly rather than as part of the present system.

We claim:

1. A method of making a polypropylene product comprising the steps of:

(a) providing an extrusion grade polypropylene;

(b) combining said extrusion grade polypropylene with a solution comprising a nucleating agent and a liquid miscible with said nucleating agent, to form a composition; and (c) processing said composition into said product, wherein said liquid is removed.

2. A method according to claim 1 wherein said product is a biaxially oriented film.

3. A method according to claim 1 wherein said product is a plurality of pellets.

4. A method according to claim 1 wherein said product is a powder.

5. A method according to claim 1 wherein said solution comprises about 25 to about 1000 ppm nucleating agent.

6. A method according to claim 2 wherein said solution comprises about 50 to about 800 ppm nucleating agent.

7. A method according to claim 2 wherein said solution comprises about 500 to about 650 ppm nucleating agent.

8. A method according to claim 1 wherein said liquid comprises water.

9. A method according to claim 1 wherein said nucleating agent comprises sodium benzoate.

* * * * *